Feb. 3, 1970 C. J. FRENZEL Re. 26,781

TRIGGER ACTUATED SWITCH DEVICE

Original Filed Dec. 27, 1965 2 Sheets-Sheet 1

INVENTOR
CARL J. FRENZEL
BY Dreist, Lockwood, Greenawalt + Dewey
ATT'YS

TRIGGER ACTUATED SWITCH DEVICE
Original Filed Dec. 27, 1965 2 Sheets-Sheet 2
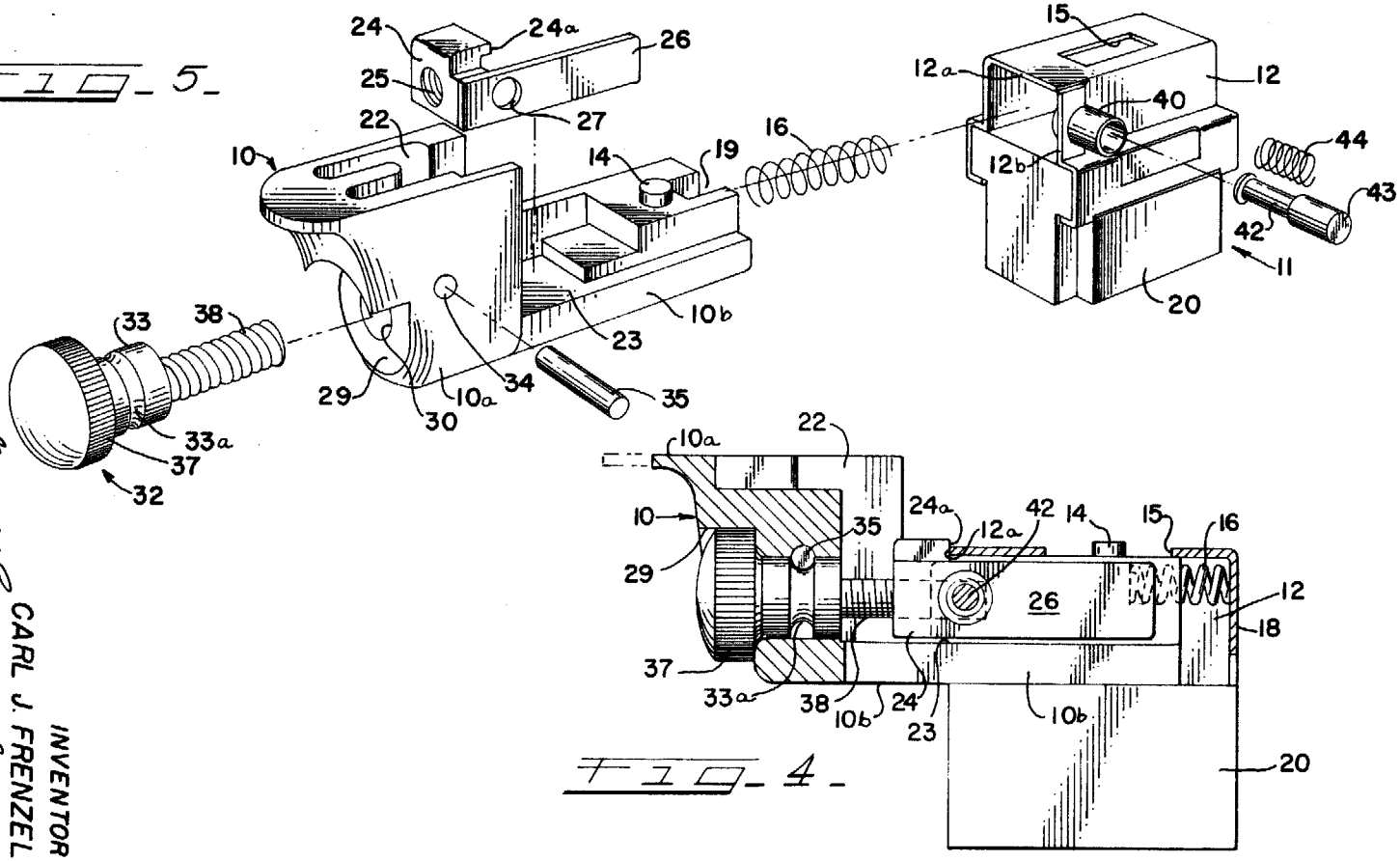
INVENTOR
CARL J. FRENZEL
BY Greist, Lockwood, Greenawalt & Dewey
ATT'YS.

United States Patent Office

Re. 26,781
Reissued Feb. 3, 1970

26,781
TRIGGER ACTUATED SWITCH DEVICE

Carl J. Frenzel, Chicago, Ill., assignor to Skil Corporation, Chicago, Ill., a corporation of Delaware Original No. 3,309,484, dated Mar. 14, 1967, Ser. No. 516,331, Dec. 27, 1965. Application for reissue Apr. 4, 1968, Ser. No. 719,792
Int. Cl. H01h *9/06, 13/08, 21/10*
U.S. Cl. 200—157 14 Claims

Matter enclosed in heavy brackets [ ] appears in the original patent but forms no part of this reissue specification; matter printed in italics indicates the additions made by reissue.

*ABSTRACT OF THE DISCLOSURE*

*The trigger carries a rotatable knob. Rotation of this knob moves an adjustable stop on the trigger which is arranged for abutting engagement with a fixed stop on the switch casing thereby to control the stroke of trigger movement. The trigger may be locked in any depressed position thereof wherein the adjustable stop is in abutting engagement with the fixed stop.*

This invention relates to trigger actuated switch devices for portable tools, and more particularly the invention relates to a new and improved trigger operated switch device including adjustable stop means for varying the stroke of the trigger and further including rocking means for locking the trigger aganst the adjustable stop means in all positions of the latter.

By way of background, reference is made to Gawron Patent No. 3,209,228, assigned to the assignee of the present invention. The Gawron patent discloses and claims a variable speed control system for portable power tools, such as power drills, which system includes a silicon controlled rectifier circuit having a variable resistor or potentiometer operated by the tool trigger. In this system, the speed of the tool motor is increased as the tool trigger is depressed or squeezed. By way of example, the speed of the tool motor may be gradually varied from 0 to 2,000 r.p.m.

In performing some operations using a power tool provided with a speed control system, such as the aforementioned Gawron system, it may be desirable to operate the tool a number of times, in a consecutive manner, at a predetermined speed, say 1,000 r.p.m. and/or it may be desirable to operate the tool for an extended period of time at a predetermined constant speed. The present invention provides a trigger actuated switch device for use with a tool and speed control system of the type described, which switch device includes an adjustable stop for varying the stroke of the trigger to allow operation of the associated tool at a desired or predetermined speed by squeezing the trigger until it is stopped, and which switch device further includes locking means for locking the trigger at any and all of its stopped positions.

A primary object of the present invention is the provision of a trigger actuated switch device including unique, manually operable means for adjusting the stroke of the trigger.

Another object of the present invention is the provision of a trigger actuated switch device having adjustable stop means for varying the stroke of the trigger and further including locking means for releasably locking the trigger in any and all of its stopped positions.

Still another object of the present invention is the provision of a trigger actuated switch device capable of fulfilling the aforementioned objects and also being capable of providing precision-like control of the tool trigger thereby to provide corresponding control of the speed of the associated motor.

These and other objects and adavntages of the invention will become apparent from the following specification disclosing a preferred embodiment of the invention which is illustrated in the accompanying drawings whereing:

FIG. 4 is a partially sectioned side elevation of the switch device in the configuration illustrated in FIG. 3; and FIG. 5 is an exploded, perspective view of the trigger operated switch device.

Figure 2:
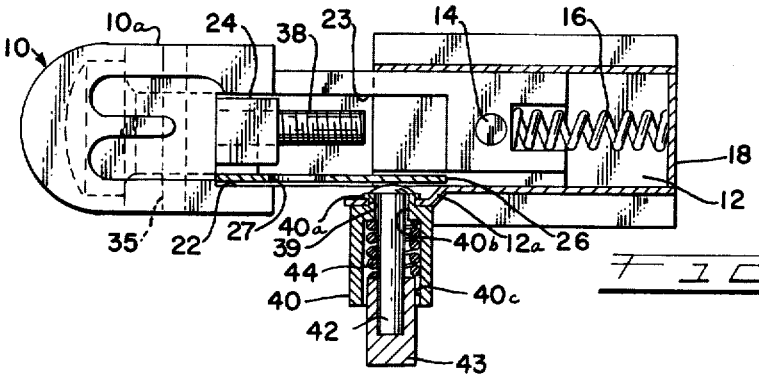
FIG. 2 is a partially sectioned top plan view of the switch showing the trigger in its fully extended or off position.

Referring now to the drawings, the illustrated embodiment of the trigger actuated switch device of this invention includes a trigger 10 of unitary construction having a finger engageable portion 10a and a stem portion 10b. The switch unit further includes a casing 11 having a sheet metal member 12 defining a guideway slidably receiving stem portion 10b of the trigger. Stem portion 10b includes or carries an upwardly extending projection or button 14 which is received in an elongated slot 15 formed in the top wall of casing 12. Abutting engagement of the button 14 with opposite ends of the slot 15 determines the maximum stroke of the trigger. A spring 16 contained within the casing 12 yieldably urges the trigger 10 to its outermost or extended position, i.e., the off position, which is established by abutting engagement of button 14 with the front end of slot 15 (see FIG. 1). One end of spring 16 abuts an end plate 18 of the casing 12, and the other end of the spring is received within a cavity 19 formed in trigger stem 10b.

Casing 11 includes suitable means 20 defining a compartment adapted to receive the various components of a control system, such as the variable speed control system disclosed and claimed in the aforementioned Gawron patent. As mentioned above, the Gawron system includes a variable resistor which is operated by trigger movement. By way of example, this variable resistor may consist of a contact carried by trigger stem 10b and slidable along a rectilinear contact strip of resistance material (not shown) supported by member 20 so that the resistance is changed by movement of the trigger. As explained in the aforementioned Gawron patent, this change of resistance causes a corresponding change in the speed of the tool motor. Preferably, stem 10b and member 20 will also include cooperating contacts and contact strips constituting the "on-off" and "by-pass' switches referred to in the above mentioned Gawron patent.

The finger engageable portion 10a of the trigger includes a recess 22, and the stem portion 10b of the trigger includes a recess 23. Recesses 22 and 23 are in communication with each other. A lug or nut 24 is received within recesses 22, 23. Recess 22 has opposite side walls, and recess 23 has one side wall, all of which side walls act to prevent rotation of lug [*24*] as will be come apparent from the following specification. Lug 24 includes a threaded through bore 25. A catch plate 26, either integral with plate 24 or suitably secured thereto, includes an opening 27.

Finger engageable portion 10a of the trigger has a cavity or cut-out 29 at the front thereof. Portion 10a of the trigger also has a bore 30 with the central axis thereof extending parallel with the direction of trigger movement. Bore opens at one [*end*] of its ends into recess 22 and opens at its other end into the cavity or cut-out 29.

An adjustment screw 32 has a cylindrical portion 33 rotatably received in bore 30 of trigger portion 10a. This cylindrical portion includes an annular groove 33a. Trigger portion 10a includes a cross bore 34 in which a pin 35 is reveived. As noted in FIG. 1, the pin 35 extends into annular groove 33a of the adjustment screw. It will be apparent that the adjustment screw 32 may be rotated relative to the trigger but [*that*] axial movement between the adjustment screw and the trigger is prevented by the pin 35. The adjustment screw further includes a knurled knob or button portion 37 which is received within the cut-out or cavity 29 of the trigger 10.

The adjustment screw 32 has a threaded shank portion 38 threadingly received in the threaded opening 25 of the lug 24. This threaded portion of the shank actually serves to support the lug on the trigger. As mentioned above, the various side walls of recesses 22 and 23 prevent rotation of the [*lug*] 24. Therefore, it will be apparent that upon rotation of the adjustment screw 32, lug 24 will be moved along the shank 38 i.e., relative to the trigger, depending on the direction of rotation of the adjustment screw 32. Movement of lug 24 causes movement of plate 26 as these two members are either integral or suitably secured together.

Lug 24 includes a lip or abutment face 24a, which face is arranged for abutting engagement with edge 12a of the casing (see FIGS. 4 and 5). Abutting engagement of face 24a and 12a stops the trigger, i.e., limits the amount of movement or the stroke thereof.

One side wall of the casing 12 includes a bent-out portion 12b (FIGS. 2 and 3) having an opening 39 therein. A sleeve 40 includes a reduced-in-diameter portion 40a at one end thereof, which portion is fitted within the opening 39. This engagement between opening 39 and reduced-in-diameter portion 40a serves as a means for mounting the sleeve 40 on the casing 12. Sleeve 40 includes a first bore 40b and a coaxial, larger-in-diameter bore 40c. A pin 42 having a head 42a is slidably mounted in bore 40b. A button 43 is secured to the outer end of pin 42, which button is slidably received within bore 40c. A spring 44 encircles pin 42. One end of the spring abuts an annular shoulder between bores 40b, 40c, and the other end of the spring abuts the inner end of button 43.

Figure 3:
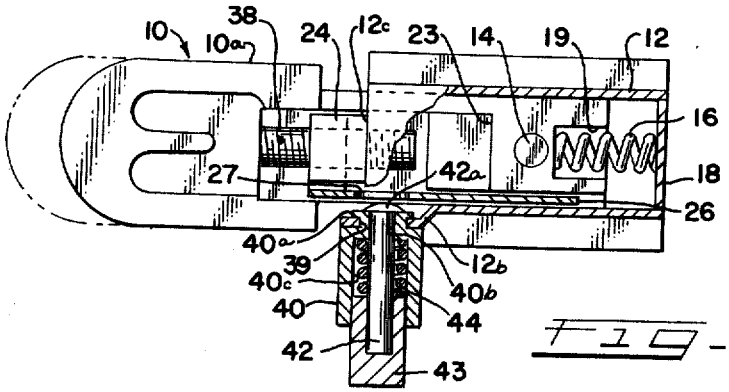
FIG. 3 is a partially sectioned top plan view of the switch device showing the trigger in one of its stopped positions.

The spring 44 acts to urge pin 42 and button 43 outwardly with the head 42a of the pin against reduced-in-diameter end 40a of the sleeve (see FIG. 3). As will be explained hereinbelow, pin 42 is adapted to be inserted in opening 27 of the plate 26 for locking the trigger in its fully depressed or stopped position which is determined by abutting engagement of button 14 with the inner end of slot 15 and in any stopped position determined by abutting engagement of face 24a with casing edge 12a.

For purposes of the following discussion of the operation of the trigger actuated switch device of this invention, assume that the same is mounted within the pistol grip portion of a portable tool, such as a power drill. The pistol grip portion of a power tool is fragmentarily illustrated in FIG. 1 and designated by the numeral 45. When the trigger operated switch unit is mounted in the handle grip portion of the tool, trigger portion 10a extends outwardly through an opening 46 in the tool housing thereby to permit manual depression of the trigger. The tool housing also includes an opening (not shown) for accommodating sleeve 40 of the locking mechanism. Assume further, for purposes of illustration only, that the compartment 20 contains the various components of the variable speed control system covered in the aforesaid Gawron patent. The trigger 10 will be connected to the variable resistor in such circuit so that as the trigger is depressed, the speed of the associated tool motor is correspondingly increased.

Figure 1:
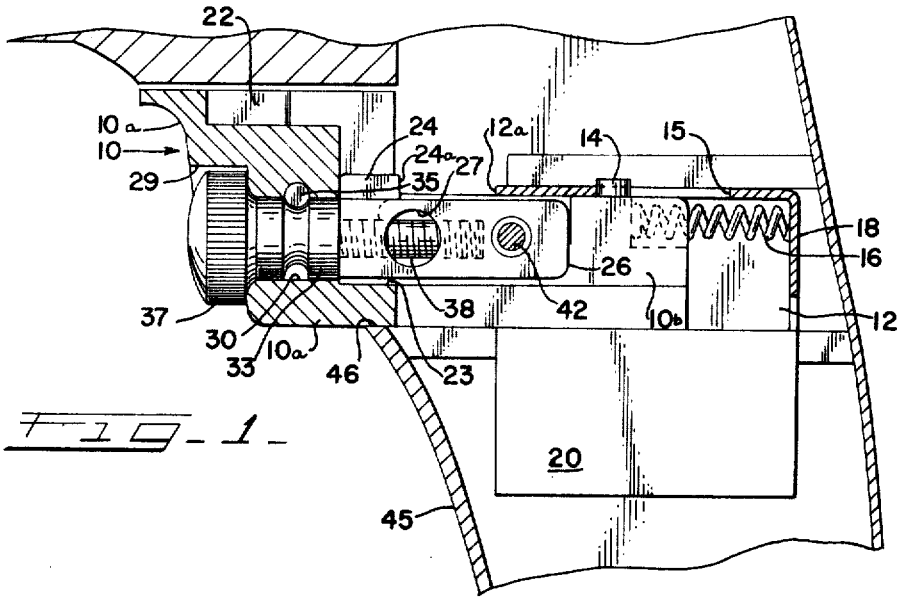
FIG. 1 is a partially sectioned side elevation of one embodiment of the trigger actuated switch device of the present invention showing the same mounted in a portable tool, such as a power drill.

If it is not desired to use the adjustable stop and locking feature of the present invention, knurled knob 37 of the adjustment screw 32 is rotated for moving lug 24 to the left until it is fully seated within the recess 22 (FIGS. 1 and 2). In this position of the lug 24, the trigger may be squeezed or depressed until the button 14 comes into abutting engagement with the inner end of slot 15. With the trigger in this position, i.e., its maximum position, maximum speed of the associated tool is obtained. When trigger 10 is depressed as just explained, face 24a may be in abutting engagement with edge 12a or there may be a slight space between these two surfaces.

If it is desired to operate the tool motor at a speed somewhat less than its maximum speed, knob 37 of the adjustment screw is rotated for running lug 24 to the right as illustrated in the drawings. Experience in using a tool incorporating the present invention will enable the operator to know approximately how many revolutions of the knob 37 are required to bring about the desired speed of the tool. Of course, indicia (not shown) on either the button 37 or the trigger or both could be provided to indicate various speeds or trigger positions. After the lug 24 has been run along the threaded portion 38 of the adjustment screw by rotating the same, the trigger is squeezed until face 24a comes into abutting engagement with edge 12a *thereby establishing a certain control position of the trigger.* If the speed of the motor is not as desired, the trigger can be released and the knob 37 rotated in one direction or the other in order to change the speed of the motor when the trigger is again depressed *thereby establishing another control position of the trigger.*

When face 24a is brought into abutting engagement with edge 12a of the casing by squeezing of the trigger, opening 27 in plate 26 is in alignment with pin 42. Accordingly, if it is desired to lock the trigger in its stopped position, i.e., its position wherein face 24a is in abutting engagement with edge 12a, button 43 is depressed thereby causing head 42a of the pin to be forced through the opening 27 in the plate 26. Releasing of the trigger will allow the spring 16 to force the trigger slightly forwardly until the trailing portion of the opening 27 engages the shank of the pin 42 adjacent the head 42a. The trigger is unlocked by squeezing the trigger slightly until the opening 27 is brought into alignment with head 42a; when the trigger is in this position, spring 44 will act to force pin 42 outwardly clear of the plate 26, thereby releasing the trigger. It should also be mentioned that when lug 24 is in its forwardmost position relative to the trigger and when the trigger is depressed its maximum amount determined by button 14 abutting the innermost end of the slot 15, the opening 27 is in alignment with pin 42 thereby permitting the trigger to be locked in its maximum depressed position. Locking the trigger in this position permits continuous operation of the tool at its maximum speed.

It should be noted that if the trigger is depressed and locked against movement by pin 42, rotation of the adjustment button 37 will then cause movement of the trigger and, accordingly, a change in the speed of the associated tool motor. This result occurs because the engagement of the pin 42 in the opening 27 prevents axial movement of the lug 24. Therefore, when the adjustment screw 32 is rotated, the latter and the trigger itself are moved. When the trigger is locked by the pin 42 and the button 37 rotated as just described, the button 37 acts as a vernier to provide precise trigger control and therefore corresponding speed control for the associated motor.

It should be apparent that the present invention provides a unique means for adjustment or varying the stroke of the tool trigger and for locking the tool trigger when it is squeezed and stopped by operation of the adjustable stop. The knob 37 can be readily manipulated; this knob does not require an additional opening in the power tool housing as the former is contained within the tool trigger. As explained above, when the locking mechanism is actuated first and the adjustment screw then rotated, the latter acts as a vernier for providing precision-like control of the speed of the associated tool motor.

While the invention has been shown in but one form, it will be obvious to those skilled in the art that it is not to be so limited. On the contrary, the invention is susceptible of various forms and modifications without departing from the spirit and scope of the appended claims.

I claim:

1. In a portable tool having a trigger receiving housing aperture, wherein the tool is of the type adapted to contain a control system capable of varying the speed of the tool motor in response to the amount of trigger movement, a trigger actuated switch device for mounting in said tool with the trigger extending through said aperture for manual depression, said switch device comprising, a casing, a trigger mounted by the casing for oscillating movement, resilient means carried by the casing and engaged with the trigger for urging the same to its extended position, said trigger including guide means extending in parallel relation with the direction of trigger movement, lug means carried by said trigger and engaged with said guide means for movement in either direction therealong, a manually operable adjustment means including a member rotatably carried by the trigger and engaged with said lug means for moving the same in either direction along said path of movement thereof, and abutment means on said casing arranged to be engaged by said lug means upon depression of the trigger thereby to limit the amount of movement of the latter for establishing a selected speed of the tool motor.

2. In a portable tool having a trigger receiving housing aperture, wherein the tool is of the type having a control system capable of varying the speed of the tool motor in response to the amount of trigger movement, a trigger actuated electric switch device for mounting in said tool with the trigger extending through said aperture for manual depression, said switch device comprising, a casing and a trigger mounted thereby for oscillating movement, said device also including resilient means interposed between said casing and said trigger for urging the latter to its extended position, abutment means carried by said casing, adjustment means carried by said trigger including an element movable relative to the latter to and away from said abutment means along a path corresponding to the path of movement of the trigger, said element being arranged to abut said abutment means upon depression of the trigger thereby to limit the amount of movement of the latter for establishing a selected speed of the tool motor, said device including locking means engageable with said element for locking said trigger in any one of its positions determined by engagement of said element with said abutment means.

3. The switch device according to claim 1 wherein said adjustment means includes a button rotatably mounted in a bore in said trigger and being exposed for manual control.

4. The switch device according to claim 3 wherein said adjustment means further includes a screw connected to said button for rotation thereby, and wherein said lug means includes a member having an opening threadingly receiving said screw.

5. The switch device according to claim 1 further defined by, trigger locking means including a locking pin, which locking means is mounted on said casing for extending through a bore in the tool housing thereby to expose said pin for manual depression, catch means carried by said lug means and adapted to be releasably locked by said pin when the catch means is aligned with the pin.

6. A trigger actuated switch device for mounting in the housing of a portable tool with the trigger extending through a housing aperture for manual depression, wherein the tool is of the type adapted to contain a control system capable of varying the speed of the tool motor in response to the amount of trigger movement, said switch device comprising, a casing, a trigger mounted by the casing for reciprocating movement relative thereto, resilient means carried by the casing and engaged with the trigger for urging the same to its extended position, said trigger including means defining a guideway extending parallel with the direction of trigger movement, a lug in said guideway and adapted for movement in either direction therealong, which lug includes a threaded opening extending parallel with the direction of movement of the lug, said trigger including a bore extending parallel with the direction of trigger movement and opening at the front of said trigger, adjustment screw means rotatably mounted in said bore and having a portion thereof disposed exteriorly of said trigger adjacent the front thereof, means for preventing axial movement of said adjustment screw means relative to said trigger, said adjustment screw means being threadingly engaged in the opening of said lug for moving the latter in response to rotation of the former, and abutment means on said casing arranged to be engaged by said lug upon depression of the trigger thereby to limit the amount of movement of the latter.

7. The switch device according to claim 6 further defined by, trigger locking means including a locking pin, which locking means is mounted on said casing for extending through a bore in the tool housing thereby to expose said pin for manual depression, catch means carried by said lug and adapted to be releasably locked by said pin when the catch means is aligned with the pin.

8. A trigger actuated switch device for mounting in the housing of a portable tool with the trigger extending through a housing aperture for manual depression, wherein the tool is of the type adapted to contain a control system capable of varying the speed of the tool motor in response to the amount of trigger movement, said switch device comprising, a casing, a trigger mounted by the casing for reciprocal movement relative thereto, resilient means carried by the casing and engaged with the trigger for urging the same to its extended position, said trigger including means defining a guideway extending parallel with the direction of trigger movement, a lug in said guideway and adapted for movement in either direction therealong, which lug includes a threaded opening extending parallel with the direction of movement of the lug, said trigger including a cavity at the front thereof, said trigger further including a bore extending parallel with the direction of trigger movement and opening into said cavity, an adjustment screw rotatably mounted in said bore and having the head thereof received within said cavity, means for preventing axial movement of said adjustment screw relative to the trigger, said adjustment screw having a threaded portion threadingly engaged in the opening of said lug for moving the latter in response to rotation of the former, abutment means on said casing arranged to be engaged by said lug upon depression of the trigger thereby to limit the amount of movement of the latter, trigger locking means including a locking pin, which locking means is mounted on said casing for extending through a bore in the tool housing thereby to expose said pin for manual depression, catch means carried by said lug and adapted to be releasably locked by said pin when the catch means is aligned with the pin.

9. The switch device according to claim 8 wherein said catch means includes a plate having an opening therein for receiving said pin.

10. The switch device according to claim 8 further defined by, said casing including a compartment adapted to receive the components of a solid state speed control circuit.

*11. For use with a portable tool having a housing with a trigger-receiving aperture, wherein such tool is of the type adapted to use a control system capable of varying the speed of the tool motor in response to the amount of trigger movement, a trigger actuated switch device for mounting in said housing with the trigger extending through said aperture for manual depression, said switch device comprising, a casing, a trigger mounted by the casing for oscillating movement relative thereto, resilient means interposed between said trigger and said casing for urging the former in one direction of movement thereof to an extended position, a fixed abutment surface on said casing and a movable abutment surface on said trigger for movement relative thereto, manual adjustment means carried by said trigger and connected with said movable abutment surface for moving the same to one position permitting said trigger to be moved a first disance in its other direction thereby establishing a first control position, which adjustment means also serve to move said movable abutment surface to at least one other position, whereby the same, upon movement of said trigger in said other direction, abuts said fixed abutment surface thereby to limit the amount of movement of said trigger in the other direction to a distance less than said first distance thereby establishing a second control position.*

*12. The trigger actuated switch device according to claim 11 further defined by, manually operated locking means on said casing and cooperating catch means on said trigger for locking the latter in both its first and second control positions.*

*13. The trigger actuated switch device according to claim 11 further defined by, said trigger being mounted for reciprocal movement and including a bore extending in parallel relation with its path of movement, said adjustment means including a member rotatably mounted in said bore and having a finger-manipulated knob at the outer end thereof for rotating said member, said member carrying said movable abutment surface for moving the latter between said one and said other position thereof upon rotation of said knob.*

*14. For use with a portable tool having a housing with a trigger-receiving aperture, wherein the tool is of the type adapted to use a control system capable of varying the speed of the tool motor in response to the amount of trigger movement, a trigger actuated switch device for mounting in said tool with the trigger extending through said aperture for manual depression, said switch device comprising, a casing and a trigger mounted thereby for oscillating movement, said device also including resilient means interposed between said casing and said trigger for urging the latter to its extended position, abutment means carried by said casing, adjustment means carried by said trigger and including an element adapted for abutting engagement with said abutment means, said element being movable relative to the trigger by operation of said adjustment means thereby to vary the limit of trigger movement upon depression of the trigger.*

References Cited

The following references, cited by the Examiner, are of record in the patented file of this patent or the original patent.

UNITED STATES PATENTS

| | | | |
|---|---|---|---|
| 3,378,662 | 4/1968 | Sorenson | 200—157 |
| 3,383,943 | 5/1968 | Piber | 200—157 X |
| 1,712,261 | 5/1929 | Farley | 200—157 |

ROBERT S. MACON, Primary Examiner

D. SMITH, Jr., Assistant Examiner

U.S. Cl. X.R.

74—527

Notice of Adverse Decision in Interference

In Interference No. 97,893, involving Patent No. Re. 26,781, C. J. Frenzel, TRIGGER ACTUATED SWITCH DEVICE, final judgment adverse to the patentee was rendered Feb. 25, 1974, as to claim 14.

[*Official Gazette August 5, 1975.*]

Disclaimer

Reissue No. 26,781.—*Carl J. Frenzel*, Chicago, Ill. TRIGGER ACTUATED SWITCH DEVICE. Patent dated Feb. 3, 1970. Disclaimer filed May 21, 1976, by the assignee, *Skil Corporation*

Hereby enters this disclaimer to claims 1 through 7, inclusive, and 11 through 14, inclusive, of said patent.

[*Official Gazette May 25, 1976.*]